US008515918B2

(12) United States Patent
Borders

(10) Patent No.: US 8,515,918 B2
(45) Date of Patent: Aug. 20, 2013

(54) METHOD, SYSTEM AND COMPUTER PROGRAM PRODUCT FOR COMPARING OR MEASURING INFORMATION CONTENT IN AT LEAST ONE DATA STREAM

(76) Inventor: Kevin R. Borders, Silver Spring, MD (US)

( * ) Notice: Subject to any disclaimer, the term of this patent is extended or adjusted under 35 U.S.C. 154(b) by 309 days.

(21) Appl. No.: 12/454,616

(22) Filed: May 19, 2009

(65) Prior Publication Data

US 2009/0287734 A1 Nov. 19, 2009

Related U.S. Application Data

(63) Continuation-in-part of application No. 12/317,056, filed on Dec. 18, 2008, and a continuation-in-part of application No. 11/255,835, filed on Oct. 21, 2005, now Pat. No. 8,079,080.

(60) Provisional application No. 61/128,200, filed on May 20, 2008.

(51) Int. Cl.
*G06F 17/30* (2006.01)
(52) U.S. Cl.
USPC .......................................... 707/687; 726/22
(58) Field of Classification Search
USPC ...................................................... 726/22
See application file for complete search history.

(56) References Cited

U.S. PATENT DOCUMENTS

| 2002/0144156 | A1* | 10/2002 | Copeland, III | 713/201 |
|---|---|---|---|---|
| 2007/0150949 | A1* | 6/2007 | Futamura et al. | 726/22 |
| 2009/0113545 | A1* | 4/2009 | Pic et al. | 726/22 |
| 2009/0171990 | A1* | 7/2009 | Naef, III | 707/100 |

OTHER PUBLICATIONS

Seward, Julian, bzip2 and libbzip2, version 1.0.5—A Program and Library for Data Compression, http://www.bzip.org/1.0.5/bzip2-manual-1.0.5.html, 2007, pp. 1-12.
Shannon, C.E., Prediction and Entropy of Printed English, Bell SystemTechnical Journal, 30:50-64, 1951, pp. 50-64.
Servetto, Sergio D., et al., Communication Using Phantoms: Covert Channels in the Internet, In Proc. of the IEEE International Symposium on Information Theory, 2001, pp. 229.
Sun Microsystems, Java, http://www.java.com, 2008, pp. 1-2.
Vontu, Data Loss Prevention, Confidential Data Protection—Protect Your Data Anywhere, http://www.vontu.com, 2008, pp. 1.
Wagner, Robert A., The String-to-String Correction Problem, Journal of the ACM, 21(1), 1974, pp. 168-173.

(Continued)

*Primary Examiner* — Rehana Perveen
*Assistant Examiner* — Alexander Khong
(74) *Attorney, Agent, or Firm* — Brooks Kushman P.C.

(57) ABSTRACT

Method, system and computer program product for comparing or measuring information content in at least one data stream including one or more data segments is provided. In at least one embodiment of the invention, information leak capacity in network traffic is quantified. Instead of trying to detect the presence of sensitive data—an impossible task in the general case—one goal of the method, system and computer program product is to measure and constrain its maximum volume. Most network traffic is repeated or determined by external information, such as protocol specifications or messages sent by a server. By filtering this data, one can isolate and quantify true information flowing from a computer. Measurement algorithms for the Hypertext Transfer Protocol (HTTP), the main protocol for web browsing are provided. When applied to real web browsing traffic, the algorithms were able to discount 98.5% of measured bytes and effectively isolate information leaks.

32 Claims, 5 Drawing Sheets

(a)

(56) References Cited

OTHER PUBLICATIONS

Websense, Inc., Web Security, Internet Filtering and Internet Security Software, http://www.websense.com/global/en/, 2008, pp. 1.
Yumerefendi, Aydan R., et al., TightLip: Keeping Applications From Spilling the Beans, In Proc. of the 4th USENIX Symposium on Networked Systems Design and Implementation (NSDI), 2007, pp. 159-172.
Adobe Systems Incorporated, Adobe Flash Player http://www.macromedia.com/software/flash/about,2008. pp. 1.
Anderson, Ross J., et al., On The Limits of Steganography, IEEE Journal of Selected Areas in Communications, 16(4): 1998, pp. 474-482.
Borders, Kevin R., et al., Web Tap: Detecting Covert Web Traffic, In Proc. of the 11th ACM Conference on Computer on Communications Security (CCS), 2004, pp. 1-11.
Borders, Kevin R., et al., Towards Quantification of Network-Based Information Leaks via HTTP, In Proc. of the 3rd USENIX Workshop on Hot Topics in Security, 2008, pp. 1-6.
Brand, S., DoD 5200.28-STD Department of Defense Trusted Computer System Evaluation Criteria (Orange Book). National Computer Security Center, 1985, pp. 1-94.
Cabuk, S., et al., IP Covert Timing Channels: Design and Detection, In Proc. of the 11th ACM Conference on Computer and Communications Security (CCS), 2004, pp. 178-187.C.
Castro, Simon, et al., How to Cook a Covert Channel, hakin9, http://www.gray-world.net/projects/cooking_channels/hakin9_cooking_channels_en.pdf, Jan. 2006, pp. 1-5.
Gailly, J., et al., The gzip Home Page, http://www.gzip.org/,2008, pp. 1-9.
Giles, James, et al., An Information-Theoretic and Game-Theoretic Study of Timing Channels, IEEE Transactions on Information Theory, 48:2455-2477, 2003, pp. 1-24.
Handley, Mark, et al., Network Intrusion Detection: Evasion, Traffic Normalization, and End-to-End Protocol Semantics, In Proc. of the 10th USENIX Security Symposium, 2001, 1-17.
Kang, Myong H., et al., A Network Version of The Pump, In Proc. of The 1995 IEEE Symposium in Security and Privacy, 1995, pp. 143-154.
Malan, G., et al., Transport and Application Protocol Scrubbing, In Proc. of the IEEE INFOCOM 2000 Conference, 2000, pp. 1-10.
McCamant, S., et al., Quantitative Information Flow as Network Flow Capacity, In Proc. of the ACM SIGPLAN conference on Programming Language Design and Implementation (Pldi), 2008, pp. 1-13.
Mozilla, The Firefox Web Browser, http://www.mozilla.com/firefox/, 2008, pp. pp. 1-2.
Mozilla, SpiderMonkey (Jayscript-C) Engine, http://www.mozilla.org/js/spidermonkey/, 2008, pp. 1-2.
Myers, A., et al., Jif: Java + Information Flow, http://www.cs.cornell.edu/jif, 2001, pp. 1-6.
Richardson, Robert, CSI Computer Crime and Security Survey, http://i.cmpnet.com/v2.gocsi.com/pdf/CSISurvey2007.pdf, 2007, pp. 1-30.
RSA Security, Inc. RSA Data Loss PreventionSuite, RSA Solution Brief, http://www.rsa.com/products/EDS/sb/DLPST_SB_1207-lowres.pdf, 2007, pp. 1-8.
Schear, N., et al., Glavlit: Preventing Exfiltration at Wire Speed, In Proc. of the 5th Workshop on Hot Topics in Networks (HotNets), 2006, pp. 1-158.

* cited by examiner

METHOD, SYSTEM AND COMPUTER PROGRAM PRODUCT FOR COMPARING OR MEASURING INFORMATION CONTENT IN AT LEAST ONE DATA STREAM

CROSS-REFERENCE TO RELATED APPLICATIONS

This application claims the benefit of U.S. provisional patent application having Application Ser. No. 61/128,200, entitled "Method and System for Identifying At Least One of Undesirable Network Traffic, Computer Programs and Computer Files", and filed May 20, 2008. This application is a continuation-in-part application of patent application having application Ser. No. 11/255,835, entitled "Method, System and Computer Program Product for Detecting Security Threats in a Computer Network", filed Oct. 21, 2005, and now issued as U.S. Pat. No. 8,079,080. This application is a continuation-in-part of patent application having application Ser. No. 12/317,056, entitled "Method, System and Computer Program Product for Detecting At Least One of Security Threats and Undesirable Computer Files", and filed Dec. 18, 2008.

BACKGROUND

1. Field of the Invention

This invention relates to methods, systems and computer program products for comparing or measuring information content in at least one data stream including one or more data segments.

2. Background Art

The following references are cited herein:

[1] Adobe Systems Incorporated. Adobe Flash Player. http://www.macromedia.com/software/flash/about, 2008.
[2] R. Anderson and F. Petitcolas. On the Limits of Steganography. *IEEE Journal of Selected Areas in Communications*, 16(4):474-481, 1998.
[3] K. Borders and A. Prakash. Web Tap: Detecting Covert Web Traffic. *In Proc. of the 11th ACM Conference on Computer and Communications Security (CCS)*, 2004.
[4] K. Borders and A. Prakash. Towards Quantification of Network-Based Information Leaks Via HTTP. *In Proc. of the 3rd USENIX Workshop on Hot Topics in Security*, 2008.
[5] S. Brand. DoD 5200.28-STD Department of Defense Trusted Computer System Evaluation Criteria (Orange Book). *National Computer Security Center*, 1985.
[6] S. Cabuk, C. Brodley, and C. Shields. IP Covert Timing Channels: Design and Detection. *In Proc. of the 11th ACM Conference on Computer and Communications Security (CCS)*, 2004.
[7] S. Castro. How to Cook a Covert Channel. hakin9, http://www.gray-world.net/projects/cooking_channels/hakin9_cooking_channels_en.pdf, 2006.
[8] J. Gailly and M. Adler. The gzip Home Page. http://www.gzip.org/, 2008.
[9] J. Giles and B. Hajek. An Information-Theoretic and Game-Theoretic Study of Timing Channels. *IEEE Transactions on Information Theory*, 48:2455-2477, 2003.
[10] M. Handley, V. Paxson, and C. Kreibich. Network Intrusion Detection: Evasion, Traffic Normalization, and End-to-End Protocol Semantics. *In Proc. of the 10th USENIX Security Symposium*, 2001.
[11] M. Kang, I. Moskowitz, and D. Lee. A Network Version of the Pump. *In Proc. of the 1995 IEEE Symposium in Security and Privacy*, 1995.
[12] G. Malan, D. Watson, F. Jahanian, and P. Howell. Transport and Application Protocol Scrubbing. *In Proc. of the IEEE INFOCOM 2000 Conference*, 2000.
[13] S. McCamant and M. Ernst. Quantitative Information Flow as Network Flow Capacity. *In Proc. of the ACM SIGPLAN Conference on Programming Language Design and Implementation (PLDI)*, 2008.
[14] Mozilla. The Firefox Web Browser. http://www.mozilla.com/firefox/, 2008.
[15] Mozilla. SpiderMonkey (Javscript-C) Engine. http://www.mozilla.org/js/spidermonkey/, 2008.
[16] A. Myers, N. Nystrom, L. Zheng, and S. Zdancewic. Jif: Java information flow. http://www.cs.cornell.edu/jif, 2001.
[17] R. Richardson. CSI Computer Crime and Security Survey. http://i.cmpnet.com/v2.gocsi.com/pdf/CSISurvey2007.pdf, 2007.
[18] RSA Security, Inc. RSA Data Loss Prevention Suite. *RSA Solution Brief*, http://www.rsa.com/products/EDS/sb/DLPST_SB__1207-lowres.pdf, 2007.
[19] N. Schear, C. Kintana, Q. Zhang, and A. Vahdat. Glavlit: Preventing Exfiltration at Wire Speed. *In Proc. of the 5th Workshop on Hot Topics in Networks (HotNets)*, 2006.
[20] J. Seward. bzip2 and libbzip2, version 1.0.5—A Program and Library for Data Compression. http://www.bzip.org/1.0.5/bzip2-manual-1.0.5.html, 2007.
[21] C. Shannon. Prediction and Entropy of Printed English. *Bell System Technical Journal*, 30:50-64, 1951.
[22] S. Servetto and M. Vetterli. Communication Using Phantoms: Covert Channels in the Internet. *In Proc. of the IEEE International Symposium on Information Theory*, 2001.
[23] Sun Microsystems. Java. http://www.java.com, 2008.
[24] VONTU. Data Loss Prevention, Confidential Data Protection—Protect Your Data Anywhere. http://www.vontu.com, 2008.
[25] R. Wagner and M. Fischer. The String-to-String Correction Problem. *Journal of the ACM*, 21(1):168-173, 1974.
[26] Websense, Inc. Web Security, Internet Filtering, and Internet Security Software. http://www.websense.com/global/en/, 2008.
[27] A. Yumerefendi, B. Mickle, and L. Cox. TightLip: Keeping applications from spilling the beans. *In Proc. of the 4th USENIX Symposium on Networked Systems Design and Implementation (NSDI)*, 2007.

As the Internet grows and network bandwidth continues to increase, administrators are faced with the task of keeping confidential information from leaving their networks. Today's network traffic is so voluminous that manual inspection would be unreasonably expensive. In response, researchers have created data loss prevention systems that check outgoing traffic for known confidential information. These systems stop naïve adversaries from leaking data, but are fundamentally unable to identify encrypted or obfuscated information leaks. What remains is a high-capacity pipe for tunneling data to the Internet.

Network-based information leaks pose a serious threat to confidentiality. They are the primary means by which hackers extract data from compromised computers. The network can also serve as an avenue for insider leaks, which, according to a 2007 CSI/FBI survey, are the most prevalent security threat for organizations [17]. Because the volume of legitimate network traffic is so large, it is easy for attackers to blend in with normal activity, making leak prevention difficult. In one experiment, a single computer browsing a social networking site for 30 minutes generated over 1.3 MB of legitimate request data—the equivalent of about 195,000 credit card numbers. Manually analyzing network traffic for leaks would be unreasonably expensive and error-prone. Due to the heavy volume of normal traffic, limiting network traffic based on the raw byte count would only help stop large information leaks.

In response to the threat of network-based information leaks, researchers have developed data-loss prevention (DLP) systems [18, 24]. DLP systems work by searching through outbound network traffic for known sensitive information, such as credit card and social security numbers. Some systems even catalog sensitive documents and look for excerpts in outbound traffic. Although they are effective at stopping accidental and plain-text leaks, DLP systems are fundamentally unable to detect obfuscated information flows. They leave an open channel for leaking data to the Internet.

SUMMARY

An object of at least one embodiment of the invention is to provide a method, system and computer program product for precisely quantifying information leak capacity in network traffic. Rather than searching for known sensitive data—an impossible task in the general case—its maximum volume is measured and constrained.

At least one embodiment of the invention addresses the threat of a hacker or malicious insider extracting sensitive information from a network. He or she could try to steal data without being detected by hiding it in the noise of normal outbound traffic. For web traffic, this often means stashing bytes in paths or header fields within seemingly benign requests. To combat this threat, the fact that a large portion of legitimate network traffic is repeated or constrained by protocol or application specifications is exploited. This fixed data can be ignored, which isolates real information leaving a network, regardless of data hiding techniques.

In carrying out the above object and other objects of at least one embodiment of the invention, a method of comparing or measuring information content in at least one data stream including one or more data segments is provided. The method includes providing a library. The method further includes processing at least one data stream including one or more data segments based on a specification to obtain possible message or data fields. The method still further includes populating the library with values representing the possible message or data fields. The method further includes comparing at least one new data segment with the values in the populated library to obtain at least one comparison or measurement.

The at least one new data segment may include a new network message. The at least one comparison or measurement may include a compressed network message.

The at least one data stream may comprise outbound Web traffic.

One of the data segments may be a file.
One of the data segments may be a network packet.
One of the data segments may be a network message.
The network message may be a request such as an HTTP request.
The network message may be a response such as an HTTP response.

Further in carrying out the above object and other objects of the present invention, a system for comparing or measuring information content in at least one data stream including one or more data segments is provided. The system includes a processor operable to execute computer program instructions. The system further includes a memory operable to store computer program instructions accessible by the processor. The system still further includes a library stored in the memory or on disk. The system further includes computer program instructions stored in the memory to perform the steps of: processing at least one data stream including one or more data segments based on a specification to obtain possible message or data fields, populating the library with values representing the possible message or data fields, and comparing at least one new data segment with the values in the populated library to obtain at least one comparison or measurement.

The at least one new data segment may include a new network message and the at least one comparison or measurement may include a compressed network message.

The at least one data stream may include outbound Web traffic.

One of the data segments may be a file.
One of the data segments may be a network packet.
One of the data segments may be a network message.
The network message may be a request such as an HTTP request.
The network message may be a response such as an HTTP response.

Still further in carrying out the above object and other objects of the present invention, a computer program product for comparing or measuring information content in at least one data stream including one or more data segments is provided. The product includes a computer readable medium and computer program instructions recorded on the medium and executable by a processor for performing the steps of: processing at least one data stream including one or more data segments based on a specification to obtain possible message or data fields, populating a library with values representing the possible message or data fields, and comparing at least one new data segment with the values in the populated library to obtain at least one comparison or measurement.

The at least one new data segment may include a new network message and the at least one comparison or measurement may include a compressed network message.

The at least one data stream may include outbound Web traffic.

One of the data segments may be a file.
One of the data segments may be a network packet.
One of the data segments may be a network message.
The network message may be a request such as an HTTP request.
The network message may be a response such as an HTTP response.

Further in carrying out the above object and other objects of the present invention, a method of identifying and/or measuring information content in network traffic is provided. The method includes the steps of creating a library of potential message field values and comparing actual network messages to the library of values to identify and/or measure information content in the network traffic.

Still further in carrying out the above object and other objects of the present invention, a system for identifying and/or measuring information content in network traffic is provided. The system includes means for creating a library of potential message field values. The system further includes means for comparing actual network messages to the library of values to identify and/or measure information content in the network traffic.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 1$a$ and 1$b$ are graphs of bandwidth versus time of day which illustrate outbound web traffic during a typical work day with a 100 Kilobyte information leak inserted.

FIG. 2a is a screen shot illustrating a sample HTTP POST request for submitting contact information to download a file; line 1 is the HTTP request line; lines marked 2 are request headers, and line 3 is the request body; bytes counted by a simple algorithm are highlighted in gray; UI-layer data is highlighted in black with white text;

FIG. 2b is a screen shot illustrating a sample HTML document at http://www.example.com/download.html that generated the request in FIG. 2a;

DETAILED DESCRIPTION

The leak measurement techniques presented here focus on the Hypertext Transfer Protocol (HTTP), the main protocol for web browsing. However, the same principles could be applied to measuring or identifying information content that follows any protocol or file format. The algorithms presented here take advantage of HTTP and its interaction with Hypertext Markup Language (HTML) documents and Javascript code to quantify information leak capacity. The basic idea is to compute the expected content of HTTP requests using only externally available information, including previous network requests, previous server responses, and protocol or program specifications. Then, the amount of unconstrained outbound bandwidth is equal to the edit distance (edit distance is the size of the edit list required to transform one string into another) between actual and expected requests, plus timing information. Given correct assumptions about timing channel characteristics, these results may overestimate, but will never underestimate the true size of information leaks, thus serving as a tight upper bound on information leakage.

One option for measuring unconstrained bandwidth would be to use a traditional compression algorithm like gzip [8] or bzip2 [20]. This would involve building up a library from previous messages and only counting the incremental size of new requests. Traditional compression can help for simple requests that have large repeated substrings. However, this protocol-agnostic approach fails to capture complex interactions between requests and replies that go beyond string repetition. The techniques presented here use protocol knowledge to perform additional processing on input data before adding new entries to the library.

The analysis techniques presented herein take advantage of protocol interactions. Parsing all of the links on a web page, for example, helps construct an accurate distribution of expected requests. The analysis also involves executing scripts in a simulated browser environment to extract links that cannot be derived from static processing. These improvements lead to a much more precise measurement of information in outbound web traffic than conventional compression algorithms.

Figure 1B:
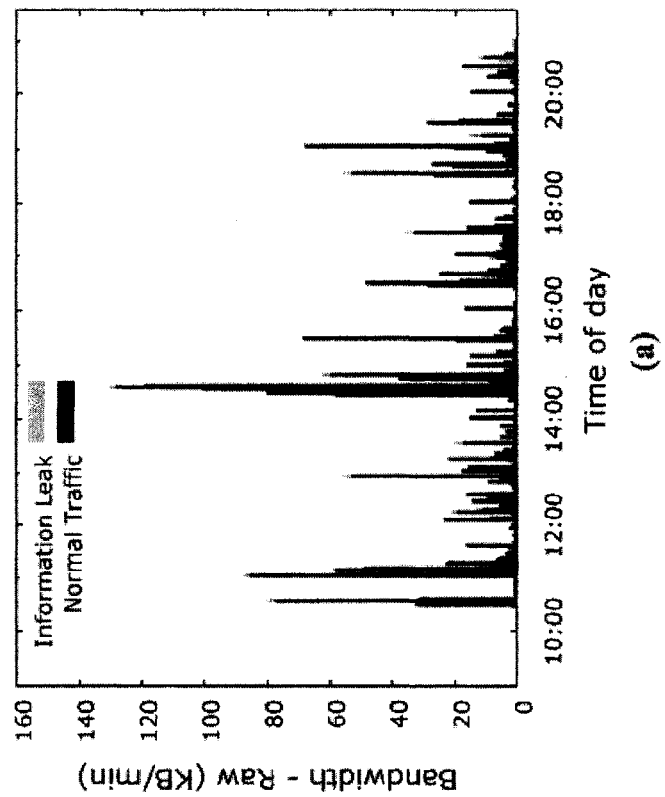
FIG. 1b illustrates the precise unconstrained byte measurement, in which the leak stands out prominently.
Figure 1A:
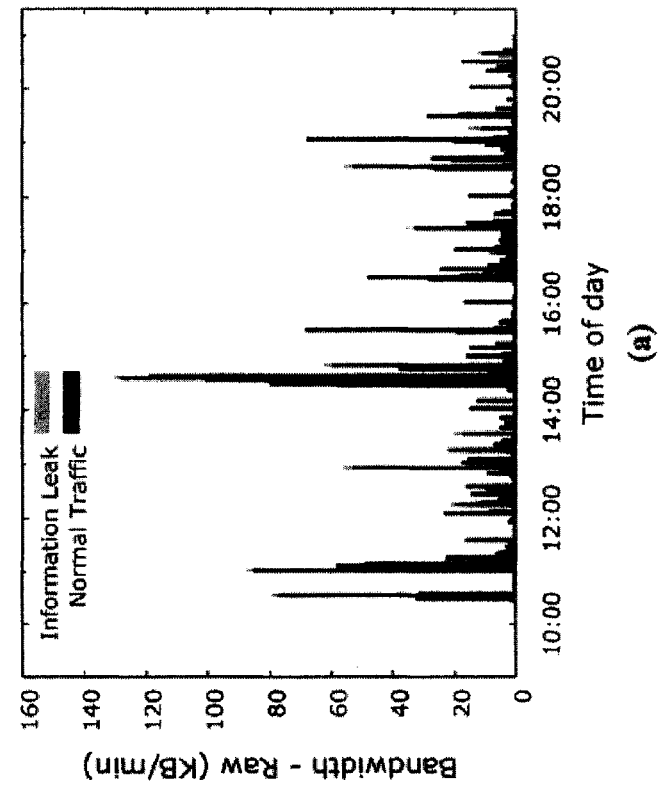
FIG. 1a illustrates the raw byte count, where the leak is barely noticeable

FIG. 1 illustrates the benefit of precise leak quantification. The graphs show bandwidth from legitimate web browsing over a one-day period in black. A 100 KB information leak was inserted into the traffic and can be seen in a lighter color. This leak was deliberately inserted in short bursts, so as to more closely resemble legitimate web traffic and avoid detection methods that look at request regularity [3]. The left graph shows raw request bandwidth. The leak is barely noticeable here and easily blends in with the noise of normal activity. After running the same traffic through the unconstrained bandwidth measurement engine, however, the leak stands out dramatically from normal traffic. More accurate traffic measurement does not completely stop information leaks from slipping by undetected; it only makes it possible to identify smaller leaks. The analysis techniques force a leak that would normally blend in with a week's worth of traffic to be spread out over an entire year.

The leak measurement techniques were evaluated on real browsing data from 10 users over 30 days, which included over 500,000 requests. The results were compared to a simple calculation described in prior research [3], and to incremental gzip compression [8]. The average request size using the leak measurement techniques described in this paper was 15.8 bytes, 1.6% of the raw byte count. The average size for gzip was 132 bytes, and for the simple measurement was 243 bytes. The experiments show that this approach is an order of magnitude better than traditional gzip compression.

The principles used to measure leaks in HTTP traffic would work for other protocols as well. Binary protocols for instant messaging, secure shell access, and domain name resolution all contain a number of fixed and repeated values. Furthermore, correlation between protocols may enable filtering of DNS lookups. Extending a similar methodology to outbound SMTP (e-mail) traffic is likely to be more challenging. E-mail primarily consists of free-form data and only contains small fixed fields. However, the unconstrained data in e-mails is usually text, for which there are well-known methods of determining the information content [21], or file attachments. These attachments are made up of data written out in a specific file format, which could be analyzed in a manner similar to HTTP. In fact, researchers have already examined ways of identifying information that has been hidden in files with steganography by looking for additional unexpected entropy [2].

The measurement techniques in this application do not provide an unconstrained bandwidth measurement for fully encrypted traffic. (If a hacker tries to hide or tunnel encrypted data in an unencrypted protocol, it can be measured.) All networks that allow outbound encrypted traffic must deal with this fundamental problem, and it is not solved here. If confidentiality is a top priority, however, this work suggests a few possibilities for obtaining original plain text. One is to force all encrypted traffic through a gateway that acts as a man-in-the-middle on each connection. This can be achieved by designating the gateway as a local certification authority and having it rewrite certificates. Another novel option introduced here is to deploy an agent on every host in the network that reports encryption keys to a monitoring system. With this approach, any connections that cannot be decrypted are subsequently blocked or flagged for further investigation.

The leak measurement techniques presented herein do not constitute an entire security solution, but rather act as a tool. The primary application of this work is forensic analysis. One could filter out almost all legitimate activity, making it faster and easier to isolate leaks. Another possible application would be detecting leaks in live network traffic. Additional research would be required to determine appropriate thresholds and optimize the algorithms for handling large volumes of traffic.

The remainder of this application is as follows. Section 2 discusses related work. Section 3 poses a formal problem description. Section 4 talks about static message analysis techniques. Section 5 describes dynamic content analysis methodology. Section 6 outlines an approach for quantifying timing information. Section 7 presents evaluation results. Section 8 discusses potential strategies for mitigating entropy and improving analysis results. Finally, section 9 concludes.

2. RELATED WORK

Prior research on detecting covert web traffic has looked at measuring information flow via the HTTP protocol [3]. Borders et al. introduce a method for computing bandwidth in outbound HTTP traffic that involves discarding expected header fields. However, they use a stateless approach and therefore are unable to discount information that is repeated or constrained from previous HTTP messages. In this evaluation, the leak measurement techniques presented herein were compared with the simple methods used by Web Tap [3] and demonstrate an order of magnitude improvement.

There are numerous techniques for controlling information flow within a program. Jif [16] ensures that programs do not leak information to low-security outputs by tainting values with sensitive data. More recent work by McCamant et al. [13] goes one step further by quantifying amount of sensitive data that each value in a program can contain. Unfortunately, intra-program flow control systems rely on access to source code, which is not always feasible. They do not protect against compromised systems. The algorithms herein take a black box approach to measuring leaks that makes no assumptions about software integrity.

Research on limiting the capacity of channels for information leakage has traditionally been done assuming that systems deploy mandatory access control (MAC) policies [5] to restrict information flow. However, mandatory access control systems are rarely deployed because of their usability and management overhead, yet organizations still have a strong interest in protecting confidential information.

A more recent system for controlling information flow, TightLip [27], tries to stop programs from leaking sensitive data by executing a shadow process that does not see sensitive data. Outputs that are the same as those of the shadow process are treated normally, and those that are different are marked confidential. TightLip is limited in that it relies on a trusted operating system, and only protects sensitive data in files. In comparison, the leak measurement methods will help identify leaks from a totally compromised computer, regardless of their origin.

A popular approach for protecting against network-based information leaks is to limit where hosts can send data with a content filter, such as Websense [26]. Content filters may help in some cases, but they do not prevent all information leaks. A smart attacker can post sensitive information on any website that receives input and displays it to other clients, including useful sites such as www.wikipedia.org. Content filters are considered to be complimentary to the measurement methods, as they reduce but do not eliminate information leaks.

Though little work has been done on quantifying network-based information leaks, there has been a great deal of research on methods for leaking data. Prior work on convert network channels includes embedding data in IP fields [6], TCP fields [22], and HTTP protocol headers [7]. The methods presented herein aim to quantify the maximum amount of information that an HTTP channel could contain, regardless of the particular data hiding scheme employed.

Other research aims to reduce the capacity of network covert channels by modifying packets. Network "pumps" [11] and timing jammers [9] control transmission time to combat covert timing channels. Traffic normalizers (also known as protocol scrubbers) will change IP packets in flight so that they match a normal format [10, 12]. Glavlit is an application-layer protocol scrubber that focuses specifically on normalizing HTTP traffic from servers [19]. Traffic normalization helps eliminate covert storage channels by fixing ambiguities in network traffic. Research on normalizing network traffic to reduce covert channel capacity is complimentary to this work, which focuses on quantifying information content.

3. PROBLEM DESCRIPTION

The problem of quantifying network-based information leak capacity by isolating information from the client in network traffic is addressed herein. Information originating from the client is referred to as UI-layer input. From a formal perspective, the problem can be broken down to quantifying the set U of UI-layer input to a network application given the following information:

I—The set of previous network inputs to an application.
O—The set of current and previous network outputs from an application.
A—The application representation, which is a mapping: U×I→O of UI-layer information combined with network input to yield network output.

By definition, the set I cannot contain new information from the client because it is generated by the server. The application representation A is based either on protocol specifications, or on specifications derived from any other source, such as program specifications resulting from program analysis. In either case, it does not contain information from the client. Therefore, the information content of set O can be reduced to the information in the set U. If the application has been tampered with by malicious software yielding a different representation A', then the maximum information content of tampered output O' is equal to the information content of the closest expected output O plus the edit distance between O and O'. Input supplied to an application from all sources other than the network is considered part of U. This includes file uploads and system information, such as values from the random number generator. Timing information is also part of the set U.

4. STATIC CONTENT ANALYSIS

This section describes methods for measuring the amount of information in outbound HTTP requests by statically analyzing previous requests and responses. Some portions of the request headers are fixed and can be immediately filtered if they contain the expected values. Most of the header fields only change on rare occasion and can be discounted if they are the same as previous requests. The request path, which identifies resources on the web, is usually derived from previous HTML pages returned by the server. Filtering out repeated path values requires comparing paths to those in both prior requests and responses. Also, HTTP form post requests reference field names and default values contained in HTML pages. This section elaborates on methods for extracting expected HTTP request fields from static content.

4.1. HTTP Request Overview

There are two main types of HTTP requests used by web browsers, GET and POST. GET typically obtains resources and POST sends data to a server. An example of an HTTP POST request can be seen in FIG. 2. This request is comprised of three distinct sections: the request line, headers, and the request body. GET requests are very similar except that they do not have a request body. The request line contains the path of the requested file on the server, and it may also have script parameters. The next part of the HTTP request is the header field section, which consists of "<field>:<value>" pairs separated by line breaks. Header fields relay information such as the browser version, preferred language, and cookies. Finally, the HTTP request body comes last and may consist of arbitrary data. In the example message, the body contains an encoded name and email address that was entered into a form.

4.2. HTTP Header Fields

The first type of HTTP header field that is examined is a fixed header field. Fixed headers should be the same for each request in most cases. Examples include the preferred language and the browser version. The algorithms only count the size of these headers for the first request from each client, and count the edit distance from the most recent request on subsequent changes. Here, all HTTP headers except for Host, Referrer, and Cookie are treated as fixed. Some of these header fields, such as Authorization, may actually contain information from the user. When these fields contain new data, the edit distance is again counted with respect to the most recent request.

Next, the algorithms look at the Host and Referrer header fields. The Host field, along with the request path, specifies the request's uniform resource locator (URL). The algorithms only count the size of the Host field if the request URL did not come from a link in another page. Similarly, the algorithms only count the Referrer field's size if does not contain the URL of a previous request. Finally, the algorithms examine the Cookie header field to verify its consistency with expected browser behavior. The Cookie field is supposed to contain key-value pairs from previous server responses. Cookies should never contain UI-layer information from the client. If the Cookie differs from its expected value or the algorithms do not have a record from a previous response (this could happen if a mobile computer is brought into an enterprise network, for example), then the algorithms count the edit distance between the expected and actual cookie values. At least one known tunneling program, Cooking Channel [7], deliberately hides information inside of the Cookie header in violation of standard browser behavior. The techniques presented here correctly measure outbound bandwidth for the Cooking Channel program.

4.3. Standard GET Requests

HTTP GET requests are normally used to retrieve resources from a web server. Each GET request identifies a resource by a URL that is comprised of the server host name, stored in the Hostname header field, and the resource path, stored in the request line. Looking at each HTTP request independently, one cannot determine whether the URL contains UI-layer information or is the result of previous network input (i.e., a link from another page). If the algorithms consider the entire browsing session, however, then they can discount request URLs that have been seen in previous server responses, thus significantly improving unconstrained bandwidth measurements.

The first step in accurately measuring UI-layer information in request URLs is enumerating all of the links on each web page. The algorithms parse HTML, Cascading Style Sheet (CSS), and Javascript files to discover static link URLs, which can occur in many different forms. Links that are written out dynamically by Javascript are covered in section 5. Examples of static HTML links include:

```
<a href = "http://test.com/page"> Click Here!
</a>
<link rel = stylesheet type = "text/css" href
    = "style.css">
<img src = "image.jpg">
The less common: <script src =
"//test.com/preload.jpg">.
```

These examples would cause the browser to make requests for "page", "style.css", "image.jpg", and "preload.jpg" respectively.

After the set of links has been determined for each page, the algorithms can measure the amount of UI-layer information conveyed by GET requests for those link URLs. The first step is identifying the link's referring page. HTTP requests typically identify the referrer in a header field. If the referrer is found, then the request URL is compared against a library of mandatory and voluntary links on the referring page. Mandatory links are those that should always be loaded unless they are cached by the browser, such as images and scripts. The set of mandatory links is usually smaller and more frequently loaded. Voluntary links are those that the browser will not load unless the user takes some action, such as clicking a link. Voluntary links tend to be more numerous and are loaded less often. Finally, if a request does not identify the referrer or the referring page cannot be found, then the algorithms must go to the library of all previously seen links (mandatory and voluntary links from all pages) to look for a match.

Once a matching link from one of the three groups (mandatory, voluntary, or all) has been found, the amount of information in the request is measured as the sum of:

2 bits to identify the link group
  Log(n) bits to identify the link within the group, where n is the total number of links in the group
  The edit distance from the link URL to the actual request URL if it is not an exact match.

For approximate matches, calculating the edit distance from all URLs would be prohibitively expensive. Instead the algorithms select only a few strings from which to compute the edit distance, and then take the best answer. This preselection is done by finding strings with the longest shared substring at the beginning. The original plan for mandatory links was to not count any data if all the mandatory links were loaded in order. This works in a controlled environment, but the experiments showed that local caching prevents the browser from loading most of the mandatory links in many cases. A simpler and more effective approach is to independently count the link information in each request. This includes information conveyed by the client about whether it has each object in its cache.

4.4. Form Submission Requests

Figures 2A, 2B:
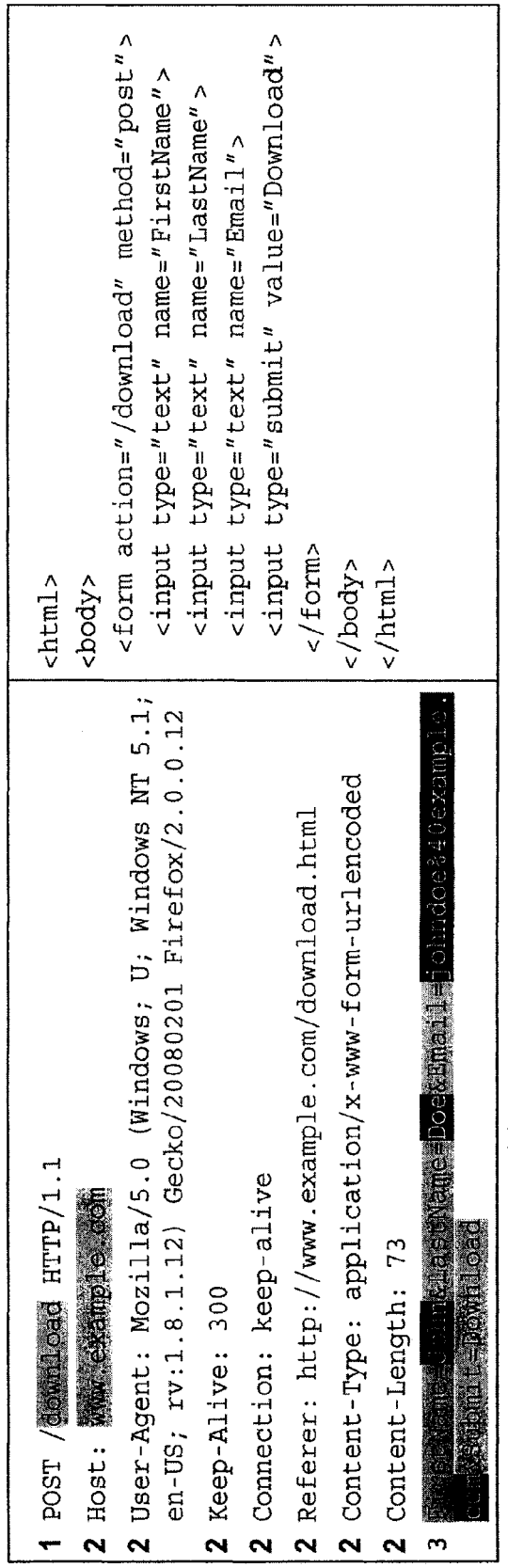

The primary method for transmitting information to a web server is form submission. Form submission requests send information that the user enters into input controls, such as text boxes and radio buttons. They may also include information originating from the server in hidden or read-only fields. Form submissions contain a sequence of delimited <name, value> pairs, which can be seen in the body of the sample POST request in FIG. 2a. The field names, field ordering, and delimiters between fields can be derived from the page containing the form, which is shown in FIG. 2b, and thus do not convey UI-layer information. Field values may also be taken from the encapsulating page in some circumstances. Check boxes and radio buttons can transmit up to one bit of information each, even though the value representing "on" can be several bytes. Servers can also store client-side state by setting data in "hidden" form fields, which are echoed back by the client upon form submission. Visible form fields may also have large default values, as is the case when editing a blog post or a social networking profile. For fields with default values, the algorithms measure the edit distance between the default and submitted values. The algorithms measure the full size of any unexpected form submissions or form fields, which may indicate an attempt to leak data.

5. DYNAMIC CONTENT ANALYSIS

Very few websites today are free from active content. This poses a challenge for leak measurement because such content may generate HTTP requests with variable URLs. The data in these requests might still be free from UI-layer information, but making this determination requires dynamic content analysis. This section describes methodology for processing and extracting expected HTTP request URLs from active web content.

5.1. Javascript

The most popular language for dynamic web page interaction is Javascript, which is implemented by almost all modern browsers. Javascript has full access to client-side settings, such as the browser version and window size, which help it deliver the most appropriate content to the user. On many websites, Javascript will dynamically construct link URLs. These URLs cannot be extracted from simple parsing. One must execute the Javascript to obtain their true values.

The leak analysis engine includes a Javascript interpreter, SpiderMonkey [15], to handle dynamic link creation. When processing an HTML document, the analysis engine first extracts static links as described in the previous section, and then executes Javascript code. A large portion of links that Javascript generates are written out during the page load process. This includes tracking images, advertisements, embedded media content, and even other scripts. The analysis engine executes Javascript as it is encountered in the HTML document in the same way as a web browser. This includes complex chaining of script tags using both the "document.write('<script . . . ')" method, and the "node.addChild (document.createElement('script'))" method. When scripts add HTML or DOM nodes to the document, the analysis engine processes the new document text, looking for newly created links. Executing scripts allows the engine to see a large set of links that are unrecoverable with static parsing.

5.2. The DOM Tree

Javascript is a stand-alone language that only has a few built-in types and objects. Most of the rich interface available to scripts inside of web pages is defined by the web browser as part of the Document Object Model (DOM). All of the elements in an HTML document are accessible to Javascript in a DOM tree, with each tag having its own node. Correctly emulating the DOM tree is important for accurate analysis because many scripts will manipulate the tree to generate links. For example, it is common for scripts to create new "Image" nodes and directly set their URLs. Advertisers also tend to use complex Javascript code to place ads on pages, often going through multiple levels of DOM node creation to load additional scripts. This presumably makes it harder for hackers to replace the advertisements, and for website owners to commit click fraud.

To obtain an accurate DOM tree representation, the analysis engine parses each HTML element and creates a corresponding DOM node. This DOM tree is available during script execution. The interface of the DOM tree is modeled after Mozilla Firefox [14]. Updating it to also reflect the quirks of other browser DOM implementations is future work. Because concern is only about data in HTTP requests and not actually rendering the web page, the DOM tree does not fully implement style and layout interfaces. Ignoring these interfaces makes the DOM implementation simpler and more efficient. The DOM tree also contains hooks for calls that cause the browser add links to a page. When a script makes such a call, the engine adds the new link URL to either the mandatory or voluntary link library, depending on the parameters. The engine can then filter subsequent HTTP requests that match the dynamically created link URL.

Another option for achieving correct DOM interactions would have been to render HTML and Javascript in a real web browser. This was not done for a few reasons. The first is efficiency. Analyzing every page in a real web browser would require setting up a dummy server to interact with the browser through the local network stack. The browser would also render the entire page and make requests to the dummy server. This adds a significant amount of unnecessary overhead. The analysis engine cuts out this overhead by directly parsing pages and only emulating parts of the DOM tree that are relevant to leak measurement. A custom DOM tree implementation also makes instrumenting and manipulating of the Javascript interpreter much easier. For example, tweaking the system time or browser version presented to Javascript would require non-trivial patches to a real browser.

5.3. Plug-Ins and Other Dynamic Content

Javascript is not the only language that enables rich web interaction and can dynamically generate HTTP requests. Popular browser plug-ins like Java [23] and Flash [1] also have such capabilities. In fact, Java Applets and Flash objects are even more powerful than Javascript. Taking things a step further, stand-alone executable programs may make HTTP requests as well. These applications are free to interact with the user, the local system, and the network in any way that they please.

Correctly extracting all possible links from plug-in objects and executables is undecidable in the general case. Some gains can be made by executing plug-in objects in a controlled environment and monitoring their output. It may also be possible to achieve some improvement through deep inspection and understanding of plug-in objects, but doing so yields diminishing returns because of their complexity and diversity.

Instead of examining dynamic content for plug-in objects, the algorithms look at previous requests to create a library of expected URLs. The leak measurement engine compares new HTTP requests that do not match a browser link to the set of all prior requests. The closest link is determined by computing the shortest edit distance from a few candidate requests that have the longest matching substring at the beginning. This approach is an effective approximation for finding the closest URL because similar URL strings are much more likely to have common elements at the beginning. The resulting information content is equal to log(m), where m is the size of the library of prior requests, plus the edit distance with respect to the similar prior request, plus two bits to indicate that the request is compared to the library of prior requests and did not come from a link on a webpage. In practice, many custom web requests are similar to previous requests. For example, RSS readers and software update services repeatedly send identical requests to check for new data. Most of these messages can effectively be filtered when measuring information leaks.

6. REQUEST TIMING INFORMATION

In addition to data in the request, HTTP messages also contain timing information. The moment at which a request occurs could be manipulated by a clever adversary to leak information. It is important to consider the bandwidth of timing channels when measuring information leaks. This is especially true for the precise unconstrained measurement techniques herein because they may yield sizes of only a few bits per request in some cases.

The amount of timing information in a request stream is equal to the number of bits needed to recreate the request times as seen by the recipient, within a margin of error. This margin of error is known as the timing interval. It is a short length of time during which the presence of a request indicates a '1' bit, and the absence of a request indicates '0'. Using a shorter interval increases the capacity of a timing channel, but also increases the error rate. Previous research on IP covert timing channels found 0.06 seconds to be an effective value for the timing interval in one case [6]. This equates to about 16.6 intervals per second. Prior work on network timing channels looks at IP packets [6]. Cabuk et al. describe a channel where IP packets are sent during timing intervals to indicate '1' bits. HTTP requests differ from IP packets in that they tend not to occur as closely together. Instead of having a regular stream of messages throughout a connection, web requests occur in short bursts during page loads, and then at long intervals in between pages. Normal HTTP traffic has a sparse timing channel in which a vast majority of the intervals are empty.

Figure 3:
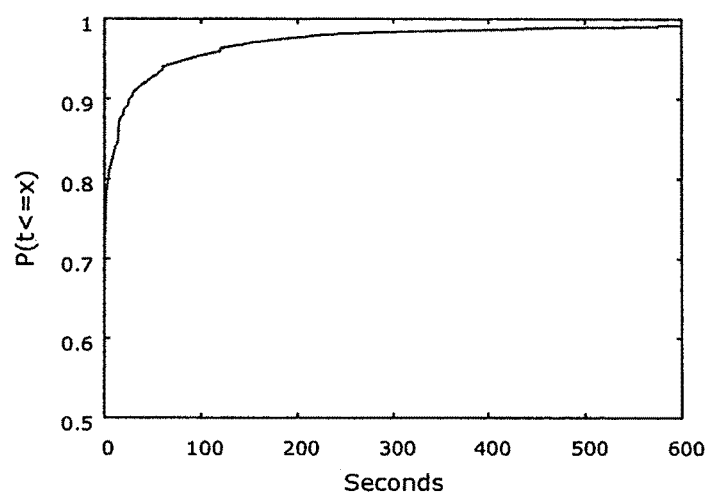
FIG. 3 is a graph illustrating the cumulative distribution of delay times for all observed HTTP requests (P(t<=3)=0.794, P(t<=192)=0.976, P(t<=3600)=0.9996.

For a sparse channel, the timing information in each HTTP request is equal to the bits needed to indicate how many empty intervals have occurred since the last request. The cumulative distribution of inter-request delays for the experiments can be seen in FIG. 3. This shows that 80% of HTTP requests occur within three seconds of each other, while 95% of requests occur within a minute and a half. Using a variable-length encoding scheme with the first 2-6 bits indicating the length, the algorithms can count the timing information in each request as follows (assuming 16 intervals per second):

Last request<=3 seconds: 6 bits
Last request<=~100 seconds: 11+2 length bits
Last request<=~50 Minutes: 16+4 length bits
Last request in past 5 years: 32+6 length bits.

This encoding provides a reasonable approximation of the information content in the timing of each request. It is important to note that these figures depend on the number of timing intervals per second. If an attacker can view messages close to the source network, then there may be more than sixteen intervals per second. On the other hand, if a web proxy is configured to increase request jitter, then the number of viable time intervals per second may be less than sixteen.

It is assumed that HTTP requests are going through a layer-7 proxy or gateway for the timing channel measurements. This means that the only meaningful time is at the start of the request. The timing of subsequent IP packets is controlled by the proxy, not the client, under normal conditions. The presence of a proxy is believed to be a reasonable assumption for timing channel measurements. Organizations that care enough about leaks to measure covert timing channels should already have a web proxy in place to mediate outbound information flow (e.g., with data loss prevention systems [18, 24]).

7. EVALUATION

The leak measurement techniques described herein were applied on web traffic from a controlled environment, and on real web browsing data. The controlled tests involved six 30-minute browsing sessions at different types of websites using a single browser. The real web traffic was collected from ten different people using a variety of browsers and operating systems over a 30-day period. Only data from the controlled scenarios was used for developing the leak measurement engine. None of the live traffic results were used to modify or improve the analysis techniques. The results of the precise unconstrained analysis are compared to incremental gzip compression, simple request analysis, and raw byte counts. The gzip tests involved measuring the amount of new compressed data for each request when using a gzip compression stream that has seen all prior requests and responses. The simple analysis is a technique described in prior research [3] that is stateless and just throws out expected request headers. This section presents the evaluation results, discusses limitations of the approach, and briefly summarizes performance results.

7.1. Controlled Tests

The leak quantification techniques on browsing traffic from controlled scenarios were first evaluated. The scenarios were 30-minute browsing sessions that included web mail (Yahoo), social networking (Facebook), news (New York Times), sports (ESPN), shopping (Amazon), and a personal blog website. The results are shown in Table 1. The precise unconstrained leak measurements for all of the scenarios were much smaller than the raw byte counts, ranging from 0.32-1.12% of the original size.

TABLE 1

Bandwidth measurement results for six web browsing scenarios using four different measurement techniques, along with the average bytes/request for the precise technique.

| Scenario | # Reqs | Raw bytes | Simple bytes/% | Gzip bytes/% | Precise bytes/% | Avg. Req. Size |
|---|---|---|---|---|---|---|
| Sports News | 911 | 1,188,317 | 199,857/16.8% | 116,650/9.82% | 13,258/1.12% | 14.5 bytes |
| Social Net. | 1,175 | 1,404,268 | 92,287/6.57% | 97,806/6.96% | 12,805/0.91% | 10.9 bytes |
| Shopping | 1,530 | 914,420 | 158,076/17.3% | 85,461/9.35% | 6,157/0.67% | 4.0 bytes |
| News | 547 | 502,638 | 74,927/14.9% | 51,406/10.2% | 3,279/0.65% | 6.0 bytes |
| Web Mail | 508 | 620,065 | 224,663/36.2% | 97,965/15.8% | 3,964/0.64% | 7.8 bytes |
| Blog | 136 | 81,162 | 10,182/12.5% | 5,534/6.82% | 262/0.32% | 1.9 bytes |

The results were best for the blog scenario because the blog website contained only one dynamic link. The analysis engine was able find an exact match for all of the other requests. Of the 262 bytes that were present in the blog scenario, 118 (45%) of them were from timing information, 86 (33%) from link selection, 48 (18%) from text entered by the user, and 10 (4%) from a Javascript link that contained a random number to prevent caching. The blog scenario represents a near ideal situation for the measurement techniques because the algorithms were able to find an exact URL match for all but one request. The resulting average of a few bytes per request serves as a lower bound for standard HTTP traffic. This traffic must at least leak timing and link selection information. One possible way to reduce timing and link selection leakage is to employ entropy normalization techniques, such as pre-fetching mandatory links with a caching proxy.

The shopping, news, and web mail scenarios all showed similar precise measurement results. Each of these websites contained a large number of dynamically constructed links that were processed correctly. However, dynamic links often contain information from the client computer. Examples include the precise system time at execution, browser window dimensions, and random numbers to prevent caching. This information must be counted because it cannot be determined by looking at previous requests and responses. From a hacker's point of view, these fields would be a good place to hide data. Opaque client-side state information was particularly prevalent in links for advertisements and tracking images on the shopping, news, and web mail sites.

Precise unconstrained bandwidth measurements for the social networking and sports news scenarios were the highest. The social networking website (Facebook.com) relied heavily on Active Javascript and XML (AJAX) requests that constructed link URLs in response to user input. Because the analysis engine did not trigger event handlers, it was unable to extract these links. The sports news website (ESPN.com) contained a number of Flash objects that dynamically fetched other resources from the web. The analysis engine could not discount these links because it did not process the plug-in objects. In the future, the engine could improve analysis accuracy by obtaining and replaying hints about input events that trigger AJAX requests and dynamic link URLs from agents running the clients. These agents need not be trusted, because incorrect hints would only increase the unconstrained bandwidth measurement.

Gzip compression [8] was more effective than simple request analysis for all but one of the controlled test cases, but fell far short of the compression level achieved by precise analysis. By running previous requests and responses through the compression stream, gzip was able to discount 84-93% of raw data. URLs and HTTP headers are filled with strings that appear elsewhere in previous requests or responses, giving gzip plenty of opportunities for compression. One benefit that gzip actually has over precise analysis, which was not enough to make a big difference, is that it compresses UI-layer data. The analysis engine will count the full size of a blog comment, for example, while gzip will compress the comment. Running unconstrained bytes through an additional compression algorithm on the back end may help to further improve precise unconstrained bandwidth measurements in the future. Generic compression algorithms other than gzip were not tested, but would expect similar results. Without protocol-specific processing, compression algorithms are limited in how effective they can be at discounting constrained information.

7.2. Quantifying Information in Real Web Traffic

Web traffic from 10 users was collected over the course of a month to evaluate the leak measurement techniques. Unlike the controlled scenarios, this traffic came from a variety of web browsers, including Firefox, Internet Explorer, Safari, and Chrome. The traffic consisted of normal daily activity from the volunteers, who consisted of co-workers, friends, and family. The data included 507,505 requests to 7052 unique hosts totaling 475 MB. 2.58 GB of response data was recorded, not including images, videos, or other binary objects. The web mail request bodies were also ignored to protect privacy. It is believed that the collected web traffic did not contain any information leaks from spyware or unusually large uploads that would have negatively skewed the results.

Figure 4:
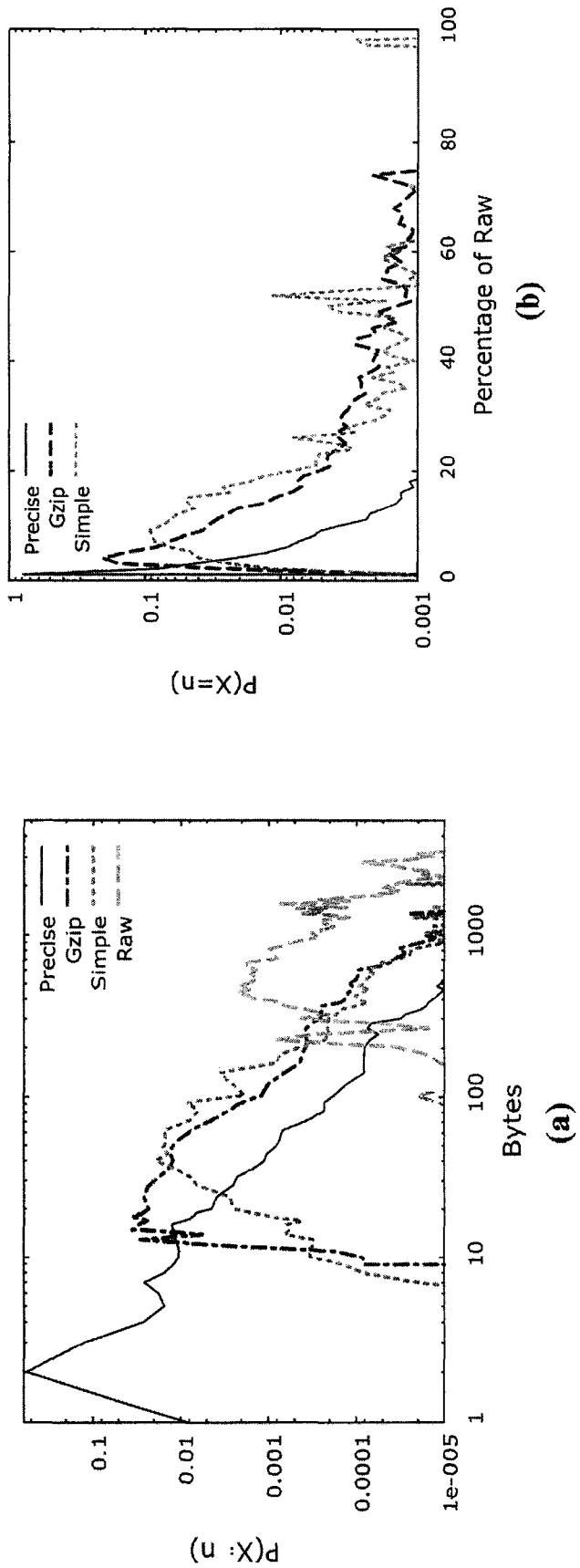
FIG. 4a are graphs illustrating the distribution of precise, gzip, simple, and raw request byte counts for real web traffic.
FIG. 4b are graphs illustrating the distribution of request byte counts as percentage of raw for precise, gzip, and simple algorithms.
Figure 5:
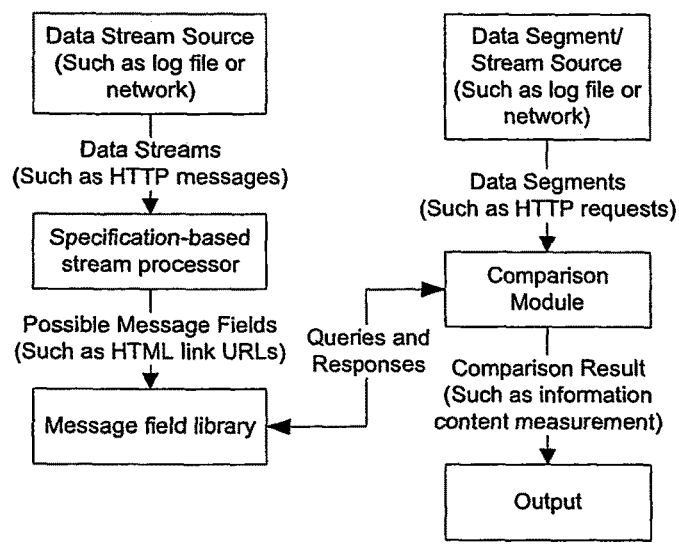
FIG. 5 is a block diagram flow chart of the steps for carrying out at least one embodiment of the present invention.

The leak measurement algorithms were run on the real web traffic one user at a time (the results do not exploit request similarities between users). The distribution of measured sizes across all requests were first computed. FIG. 4a shows the probability density function of request sizes for raw, simple, gzip, and precise measurements. The precise unconstrained bandwidth measurement algorithm dramatically outperformed the others on real web traffic. The mean precise request size was 15.8 bytes, compared to 132 for gzip, 243 for simple, and 980 for raw. Despite a low average measurement, the precise request size distribution exhibited a heavy tail (standard deviation of 287 bytes).

Requests with exact URL matches were usually a few bytes each, while many requests without exact URL matches were a few hundred bytes. The percent reduction in request size with respect to raw measurements was also calculated. These results can be seen in FIG. 4b. Again, the reduction is much better for the precise algorithm. Its measurements averaged 1.48% of the corresponding raw values, while the gzip and simple algorithms averaged 9.87% and 13.5%, respectively. The request measurements for the precise algorithm also have a lower variance, with almost all under 20% of corresponding raw values. The simple and gzip size reductions are much more spread out, with some requests measuring 20-75% of the raw size. These requests did not benefit much from gzip or simple analysis.

The unconstrained bandwidth measurement results from real traffic yielded larger values than those from the controlled test cases. The largest average request size of 14.5 bytes from the sports news test was less than the overall average of 15.8 bytes per request for real web traffic. One reason for this is that the controlled tests were not necessarily representative of real web browsing. Other sites that were not in the controlled study may not have exhibited the same mix of requests from plug-ins or event handlers. The prevalence of this source of inaccuracy was not computed, because doing so would have required manually analyzing a significant portion of the half million requests.

During real web traffic processing, a few sources of inaccuracy were witnessed that were not present in the controlled test cases. One such issue is missing cache objects. Clients may cache resources from the server for long periods of time, making those resources unavailable in a network trace. This is especially problematic for missing scripts that perform important tasks. The effects of this problem could be reduced by having the analysis engine fetch missing objects from the web. However, those objects may no longer be available or might have changed since the original request. Another source of error only found in real web traffic is the effect of different browser versions. The controlled tests were all performed with Mozilla Firefox [14]. The analysis engine's Javascript and DOM implementation also mirrored Firefox. Real web traffic from other browsers is likely to have different dynamic links corresponding to different browser behavior. These differences could be reduced by implementing other DOM interfaces to match the browser version reported in the headers of each request.

7.3. Analysis Performance

The real web traffic was analyzed on a commodity laptop computer with a dual-core Intel T2500 processor and 2 GB of RAM. The analysis algorithms ran in a single thread on one core, with the other core being utilized by the operating system. The analysis engine was able process the combined request and response stream at 1.7 Mbps. The bottleneck during processing was CPU. The real web traffic consisted of 3.04 GB of total data, 15% of which (475 MB) was request data and 85% of which (2.58 GB) was response data. The engine processed the requests at an average rate of 0.25 Mbps, and the responses at an average rate of 10.9 Mbps. This disparity in performance is due to the time required to compute the edit distance for request URLs. Javascript execution was included under the response processing time. None of the scripts were given a time limit, and none of them entered infinite loops.

Analysis performance for the prototype implementation would need improvement for use in an intrusion detection system that inspects large volumes of network traffic. One area for optimization is reducing the number of edit distance comparisons and approximating the edit distance computation by only considering multi-byte chunks. Another way to improve performance would be to employ a string coprocessor specially designed for edit distance computations. Exploring CPU performance optimizations and maximizing the throughput of the unconstrained bandwidth measurement engine is future work.

The memory footprint during analysis was quite large for the prototype implementation. It kept all of the observed links in memory and did not attempt to free older data that was less likely to improve analysis results. Processing 20 MB of web browsing traffic from one user during a single day required 120 MB of RAM. Although this would be unreasonably large for an intrusion detection application, it is believed that this number could be greatly reduced by simply discarding links from old pages. While analysis results may be a little bit worse, the number of links that are loaded from pages that have been open for hours is far smaller than links that are loaded from recent pages. Another possible optimization is sharing link information across users.

8. ENTROPY MITIGATION STRATEGIES

The evaluation showed that a significant portion of information in web requests must be counted because it originates from entropy on the client. If this entropy can be reduced or measured at a trusted source, then the analysis engine can obtain more accurate results. This section discusses strategies for reducing inaccuracies in unconstrained bandwidth measurements due to entropy on client computers.

8.1. System Information and Human Input

The current leak measurement engine cannot see actual system information or human input to a client; it only witnesses the resulting requests. Due to the complexity of active content on websites, system information and human input can sometimes lead to a chain of events that generates a much larger output than the size of the original information. For example, clicking on a particular place on a web page may lead to an AJAX request that contains a few hundred bytes of XML. Speculatively firing events would help somewhat with determining expected requests, but such an approach would quickly lead to an exponential blow-up. A better solution would be to obtain system information (screen resolution, OS, installed plug-ins, etc.) and human input hints from an agent running on the end host. This agent could be a browser plug-in that records and sends all of the system information and human input events to the analysis engine. Instead of having to speculate, the engine could then replay the exact sequence of inputs and verify that the output is the same. It could only count the size of the original input, rather than the larger resulting output. It is also okay if the agent reports data incorrectly, because doing so would only increase the unconstrained bandwidth measurement and raise suspicion.

Depending on the threat model, it may also be possible to reduce unconstrained bandwidth measurements by discounting human input entirely. This approach may be appropriate if the user is trustworthy, but malware is a concern. A trusted device, similar to a hardware key-logger, could intercept mouse and keyboard events before they reach the computer, and then report them to the leak measurement engine. This would aid analysis in a similar manner as a hint from a browser plug-in, except that the size of the original human input could be discounted as well, assuming that the user is trusted.

8.2. Timing

The timing of each request has the potential to leak several bits of information to an observer stationed outside of the network. The traditional method for mitigating timing channels is to add entropy to each request. For web traffic, this can be achieved by adding a trusted proxy server between the client and the web server. This proxy can add jitter to each web request by delaying it a random amount of time. This could significantly increase the size of the timing interval, raising it from 0.06 seconds to 1 second (any more might disrupt usage). Randomly delaying requests up to 1 second would reduce the amount of timing information in each request by 5 bits, which can add up to a significant savings for a large number of requests.

Another option available to us that would not be feasible for mitigating a traditional IP packet timing channel is reducing the total number of requests. Every time a client makes a request for a web page, a smart caching proxy could pre-fetch all of the mandatory links. Then, when the client requests a resource from a mandatory link, the proxy can return the result without any information leaving the network, thus precluding leakage through those requests.

In addition to the timing of requests themselves, some requests include an explicit time value. This is the system time at which a script executed on the end host. Websites may include this time value to prevent caching, or to collect statistics about latency from their users. In any case, it differs slightly from the time that a request actually appears on the network, has a high precision, and can therefore leak information. A proxy server can eliminate timing information of this form by discovering it with the edit distance algorithm and then overwriting it with the time that the proxy actually sends the request.

8.3. Random Number Generator

Many websites have scripts that include random numbers in link URLs. The purpose of doing this is to prevent caching. At the same time, however, these requests leak data in their selection of random numbers. One way of reducing entropy from the random number generator (RNG) is to instead have a network service that handles random number generation. When an executing script makes a call to fetch a random number, the Javascript engine could request a new random number from a trusted central location instead of using the local RNG. This would move random numbers from the set U of UI-layer input to the set I of network inputs, allowing the analysis engine to discount them from the information measurement in outbound web requests (assuming they are not modified by malware).

9. CONCLUSIONS

A new approach for quantifying information leaks in web traffic is described herein. Instead of inspecting a message's data, the goal was to quantify its information content. The algorithms herein achieve precise results by discounting fields that are repeated or constrained by the protocol. This work focuses on web traffic, but similar principles can apply to other protocols. The analysis engine processes static fields in HTTP, HTML, and Javascript to create a distribution of expected request content. It also executes dynamic scripts in an emulated browser environment to obtain complex request values.

The analysis techniques on controlled test cases and on real web traffic from 10 users over a 30-day period were evaluated. For the controlled tests, the measurement techniques yielded byte counts that ranged from 0.32%-1.12% of the raw message size. These tests highlighted some limitations of the approach, such as being unable to filter parts of URLs that contain random numbers to prevent caching. For the real web traffic evaluation, the precise unconstrained byte counts averaged 1.48% of the corresponding raw values. This was significantly better than a generic compression algorithm, which averaged 9.87% of the raw size for each request.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of measuring information content in at least one data stream including one or more data segments, the method comprising:
   providing a library;
   processing at least one data stream including one or more data segments based on a specification to obtain possible message or data fields, the fields including token and contextual information;
   populating the library dynamically with entries representing the possible message or data fields, the entries including token and contextual information;
   processing at least one new data segment based on a specification to obtain new message or data fields, the new fields including new token and contextual information;
   comparing the new message or data fields from the at least one new data segment with the entries in the populated library to identify substrings of the new message or data field tokens that are present in the library and match an expected context;
   measuring or computing a compressed size of the at least one new data segment based on the step of comparing and discounting bits representing the substrings of the at least one new data segment present in the library from bits representing the at least one new data segment to obtain a measurement of the information content in the data stream;
   identifying measurements exceeding a threshold based on an expected value of the measurements of information content in the data stream; and
   indicating an undesirable information flow based on the identifying.

2. The method as claimed in claim 1, wherein the at least one new data segment includes a new network message and wherein the at least one comparison or measurement includes a compressed network message.

3. The method as claimed in claim 1, wherein the at least one data stream comprises outbound Web traffic.

4. The method as claimed in claim 1, wherein one of the data segments is a file.

5. The method as claimed in claim 1, wherein one of the data segments is a network packet, the measurement of information content being filtered out of network data associated with the library of values used to identify the substrings that are present in the library.

6. The method as claimed in claim 1, wherein one of the data segments is a network message.

7. The method as claimed in claim 6, wherein the network message is a request.

8. The method as claimed in claim 7, wherein the request is an HTTP request.

9. The method as claimed in claim 6, wherein the network message is a response.

10. The method as claimed in claim 9, wherein the response is an HTTP response.

11. A system for measuring information content in at least one data stream including one or more data segments, the system comprising:
    a processor operable to execute computer program instructions;
    a memory operable to store computer program instructions accessible by the processor;
    a library stored in the memory or on disk; and
    computer program instructions stored in the memory to perform the steps of:
      processing at least one data stream including one or more data segments based on a specification to obtain possible message or data fields, the fields including token and contextual information;
      populating the library dynamically with entries representing the possible message or data fields, the entries including token and contextual information;
      processing at least one new data segment based on a specification to obtain new message or data fields, the new fields including new token and contextual information;
      comparing the new message or data fields from the at least one new data segment with the entries in the populated library to identify substrings of the new message or data field tokens that are present in the library and match an expected context; and
      measuring or computing a compressed size of the at least one new data segment based on the step of comparing and discounting bits representing the substrings of the at least one new data segment present in the library from bits representing the at least one new data segment to obtain a measurement of the information content in the data stream;
      identifying measurements exceeding a threshold based on an expected value of the measurements of information content in the data stream; and
      indicating an undesirable information flow based on the identifying.

12. The system as claimed in claim 11, wherein the at least one new data segment includes a new network message and wherein the at least one comparison or measurement includes a compressed network message.

13. The system as claimed in claim 11, wherein the at least one data stream comprises outbound Web traffic.

14. The system as claimed in claim 11, wherein one of the data segments is a file.

15. The system as claimed in claim 11, wherein one of the data segments is a network packet.

16. The system as claimed in claim 11, wherein one of the data segments is a network message.

17. The system as claimed in claim 16, wherein the network message is a request.

18. The system as claimed in claim 16, wherein the network message is a response.

19. A computer program product for comparing or measuring information content in at least one data stream including one or more data segments, the product comprising:
- a computer readable non-transitory, tangible medium; and
- computer program instructions recorded on the medium and executable by a processor for performing the steps of:
  - processing at least one data stream including one or more data segments based on a specification to obtain possible message or data fields;
  - populating a library dynamically with entries representing the possible message or data fields, the entries including token and contextual information;
  - processing the at least one new data segment based on a specification to obtain new message or data fields including new token and contextual information;
  - comparing the new message or data tokens from the at least one new data segment with the entries in the populated library to identify substrings of the new message or data field that are present in the library and match an expected context;
  - measuring or computing a compressed size of the at least one new data segment based on the step of comparing and discounting bits representing the substrings of the at least one new data segment present in the library from bits representing the at least one new data segment to obtain a measurement of the information content in the data stream;
  - identifying measurements exceeding a threshold based on an expected value of the measurements of information content in the data stream; and
  - indicating an undesirable information flow based on the identifying.

20. The product as claimed in claim 19, wherein the at least one new data segment includes a new network message and wherein the at least one comparison or measurement includes a compressed network message.

21. The product as claimed in claim 19, wherein the at least one data stream comprises outbound Web traffic.

22. The product as claimed in claim 19, wherein one of the data segments is a file.

23. The product as claimed in claim 19, wherein one of the data segments is a network packet.

24. The product as claimed in claim 19, wherein one of the data segments is a network message.

25. The product as claimed in claim 24, wherein the network message is a request.

26. The product as claimed in claim 24, wherein the network message is a response.

27. The method as claimed in claim 1, wherein the expected value is relative to total amount of data in the data stream.

28. The method as claimed in claim 1, wherein the expected value is relative to duration of the data stream.

29. The method as claimed in claim 1, further including identifying measurements exceeding the threshold based on a variance of the measurements of information content in the data stream relative to the expected value of the measurements of information content in the data stream.

30. The method as claimed in claim 29, wherein the variance is relative to a total amount of data in the data stream.

31. The method as claimed in claim 29, wherein the variance is relative to duration of the data stream.

32. The method as claimed in claim 1, wherein the at least one data stream includes network traffic.

* * * * *